(12) United States Patent
Kolouri et al.

(10) Patent No.: US 11,023,789 B2
(45) Date of Patent: Jun. 1, 2021

(54) MACHINE-VISION METHOD TO CLASSIFY INPUT DATA BASED ON OBJECT COMPONENTS

(71) Applicant: HRL Laboratories, LLC, Malibu, CA (US)

(72) Inventors: Soheil Kolouri, Calabasas, CA (US); Charles E. Martin, Thousand Oaks, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 120 days.

(21) Appl. No.: 15/936,403

(22) Filed: Mar. 26, 2018

(65) Prior Publication Data

US 2018/0285699 A1 Oct. 4, 2018

Related U.S. Application Data

(60) Provisional application No. 62/478,033, filed on Mar. 28, 2017.

(51) Int. Cl.
*G06K 9/66* (2006.01)
*G06K 9/62* (2006.01)
(Continued)

(52) U.S. Cl.
CPC ........... *G06K 9/66* (2013.01); *G06K 9/00664* (2013.01); *G06K 9/00791* (2013.01);
(Continued)

(58) Field of Classification Search
CPC .... G06K 9/66; G06K 9/00664; G06K 9/6274; G06K 9/4628; G06K 9/6212;
(Continued)

(56) References Cited

U.S. PATENT DOCUMENTS 9,090,259 B2 7/2015 Dolgov et al.
9,229,453 B1 1/2016 Lee
(Continued)

OTHER PUBLICATIONS

Notification of Transmittal of International Search Report and the Written Opinion of the International Searching Authority for PCT/US2018/024411; dated Jul. 16, 2018.
(Continued)

*Primary Examiner* — John W Lee
(74) *Attorney, Agent, or Firm* — Tope-McKay & Associates

(57) ABSTRACT

Described is a system for classifying objects and scenes in images. The system identifies salient regions of an image based on activation patterns of a convolutional neural network (CNN). Multi-scale features for the salient regions are generated by probing the activation patterns of the CNN at different layers. Using an unsupervised clustering technique, the multi-scale features are clustered to identify key attributes captured by the CNN. The system maps from a histogram of the key attributes onto probabilities for a set of object categories. Using the probabilities, an object or scene in the image is classified as belonging to an object category, and a vehicle component is controlled based on the object category causing the vehicle component to perform an automated action.

12 Claims, 11 Drawing Sheets

(51) Int. Cl.
  *G06K 9/00* (2006.01)
  *G06K 9/46* (2006.01)
(52) U.S. Cl.
  CPC ......... *G06K 9/4628* (2013.01); *G06K 9/6212* (2013.01); *G06K 9/6218* (2013.01); *G06K 9/6252* (2013.01); *G06K 9/6274* (2013.01); *G06K 9/6277* (2013.01)
(58) Field of Classification Search
  CPC ............. G06K 9/00791; G06K 9/6218; G06K 9/6252; G06K 9/6277
  See application file for complete search history.

(56) References Cited

U.S. PATENT DOCUMENTS

2008/0069400 A1    3/2008  Zhu et al.
2017/0308770 A1*  10/2017  Jetley .................... G06K 9/4671
2019/0005814 A1*   1/2019  Hasegawa ............ G06K 9/6274

OTHER PUBLICATIONS

International Search Report of the International Searching Authority for PCT/US2018/024411; dated Jul. 16, 2018.
Written Opinion of the International Searching Authority for PCT/US2018/024411; dated Jul. 16, 2018.
Yao Lu, "Unsupervised Learning for Image Classification", University of Helsinki Department of Computer Science, Dec. 8, 2015, see pp. 3, 6-7, 13, 43; and figures 2, 7, 12.
Guanbin Li et al., "Visual Saliency Detection Based on Multiscale Deep CNN Features", IEEE Transactions on Image Processing, Sep. 7, 2016, see pp. 1-2.
Junyuan Xie, et al., "Unsupevised Deep Embedding for Clustering Analysis", ICML'16 Proceedings of the 33rd International Conference on International Conference on Machine Learning, vol. 48, pp. 478-487, Jun. 24, 2016.
Songfan Yang, et al., "Multi-scale recognition with DAG-CNNs", 2015 IEEE International Conference on Computer Vision (ICCV), May 20, 2015, see pp. 1215-1223.
Sotiras, Aristeidis, Susan M. Resnick, and Christos Davatzikos. "Finding imaging patterns of structural covariance via non-negative matrix factorization." NeuroImage 108: pp. 1-16, 2015.
Simonyan, Karen, and Andrew Zisserman. "Very deep convolutional networks for large-scale image recognition." arXiv preprint arXiv:1409.1556, 2014, pp. 1-14.
Lindeberg, Tony. Scale-space theory in computer vision. vol. 256. Springer Science & Business Media, 2013, Chapter 7, pp. 165-170.
Xie, Junyuan, Ross Girshick, and Ali Farhadi. "UnsuperviseddDeep embedding for clustering analysis." arXiv preprint arXiv:1511.06335, 2015, pp. 1-10.
Zhou, B., Khosla, A., Lapedriza, A., Oliva, A., & Torralba, A. "Object detectors emerge in deep scene CNNs." arXiv preprint arXiv:1412.6856, 2014, pp. 1-12.
Gonzalez-Garcia, A., Modolo, D., & Ferrari, V. "Do semantic parts emerge in convolutional neural networks?" arXiv preprint arXiv:1607.03738, 2016, pp. 1-18.
Kolouri, S., Rohde, G. K., & Hoffman, H. "Sliced wasserstein distance for learning gaussian mixture models." arXiv preprint arXiv:1711.05376, 2017, pp. 1-13.
Kolouri, S., Martin, C. E., & Hoffmann, H. "Explaining Distributed Neural Activations via Unsupervised Learning." In Proceedings of the IEEE Conference on Computer Vision and Pattern Recognition Workshops, pp. 20-28, 2017.
Communication pursuant to Rules 70(2) and 70a(2) EPC and the extended European Search Report for the European Regional Phase Patent Application No. 18776168.9, dated Dec. 10, 2020.
Li Guanbin et al: "Visual Saliency Detection Based on Multiscale Deep CNN Features". IEEE Transactions on Image Processing. IEEE Service Center • Piscataway • NJ. US. vo 1 • 25. No. 11. Nov. 1, 2016 (Nov. 1, 2016). pp. 5012-5024. XP011622943. ISSN: 1057-7149. DOI: 10.1109/TIP.2016.2602079 [retrieved on Sep. 12, 2016].
Min Lin et al: "Network in Network". arXiv.org. Mar. 4, 2014 (Mar. 4, 2014). pp. 1-10. XP055536238. DOI: 10.1016jj.compeleceng.2017.12.033 Retrieved from the Internet: URL:https:jjarxiv.orgjpdf/1312.4400.pdf [retrieved on Dec. 18, 2018].
Anonymous: "Bag-of-words model in computer vision—Wikipedia", Feb. 26, 2017 (Feb. 26, 2017). XP055755253. Retrieved from the Internet: URL:https:jjen.wikipedia.orgjwjindex.php?title=Bag-of-words model in computer vision&oldid=767587299 [retrieved on Nov. 30, 2020].
Notification of International Preliminary Report on Patentability Chapter I for PCT/US2018/024411; dated Oct. 10, 2019.
International Preliminary Report on Patentability Chapter I for PCT/US2018/024411; dated Oct. 10, 2019.

* cited by examiner

MACHINE-VISION METHOD TO CLASSIFY INPUT DATA BASED ON OBJECT COMPONENTS

CROSS-REFERENCE TO RELATED APPLICATIONS

This is a Non-Provisional patent application of U.S. Provisional Application No. 62/478,033, filed in the United States on Mar. 28, 2017, entitled, "Machine-Vision Method to Classify Input Data Based on Their Components," the entirety of which is hereby incorporated by reference.

BACKGROUND OF INVENTION

(1) Field of Invention

The present invention relates to a system for machine-vision object classification and, more particularly, to a system for machine-vision object classification which incorporates object components to identify an object.

(2) Description of Related Art

Machine vision refers to technology and methods used to provide imaging-based automatic inspection and analysis for multiple applications, including, but not limited to, automatic inspection, robot guidance, and automatic classification. Zhou et al. and Gonzalez-Garcia et al. describe machine vision methods that probe each unit of a convolutional neural network (CNN) to obtain regions with highest activations per unit (see the List of Incorporated Literature References, Literature Reference Nos. 5 and 6). Disadvantages of such methods include: 1) studying the neural activations in single units as opposed to groups of units, 2) requiring humans in the loop feedback (e.g., Amazon Mechanical Turk) to identify the common theme or concept that exists between top scoring regions, and 3) neglecting the neural activation patterns over the entire network for object classification.

Thus, a continuing need exists for a system that automatically models the pattern of activations in a group of units over the entire network.

SUMMARY OF INVENTION

The present invention relates to a system for machine-vision object classification and, more particularly, to a system for machine-vision object classification which incorporates object components to identify an object. The system comprises one or more processors and a non-transitory computer-readable medium having executable instructions encoded thereon such that when executed, the one or more processors perform multiple operations. The system identifies salient regions of an intensity image based on activation patterns of a convolutional neural network (CNN) having a plurality of layers. Multi-scale features are generated for the salient regions by probing the activation patterns of the CNN at different layers. Using an unsupervised clustering technique, the multi-scale features are clustered to identify key attributes captured by the CNN. The system then maps from a histogram of the key attributes onto probabilities for a set of object categories. At least one object or scene in the intensity image is classified as belonging to an object category using the probabilities, and a vehicle component is controlled based on the object category causing the vehicle component to perform an automated action.

In another aspect, each salient region is extracted from the intensity image and identified based on the CNN's activation for each image pixel or group of image pixels in the salient region.

In another aspect, for generating the multi-scale features, the system performs general average pooling (GAP) at each layer of the CNN.

In another aspect, the unsupervised clustering technique is an unsupervised deep embedding method, and wherein the output of the unsupervised deep embedding method is an embedding mapping that embeds the multi-scale features into a subspace with the key attributes.

In another aspect, a cluster membership for each salient region is obtained using the embedding mapping. Using the cluster memberships, the histogram of key attributes is generated, wherein the histogram of key attributes encodes a normalized frequency of key attribute occurrences.

In another aspect, the system calculates a bag of key attributes (BoKA) feature for the intensity image using deep embedding for clustering. The BoKA feature is concatenated with an output feature of the CNN, resulting in concatenated features. Using the concatenated features, the at least one object or scene in the intensity image is classified.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7B is an illustration of a first confusion matrix according to some embodiments of the present disclosure;

FIG. 7C is an illustration of a second confusion matrix according to some embodiments of the present disclosure;

DETAILED DESCRIPTION

Figure 1:
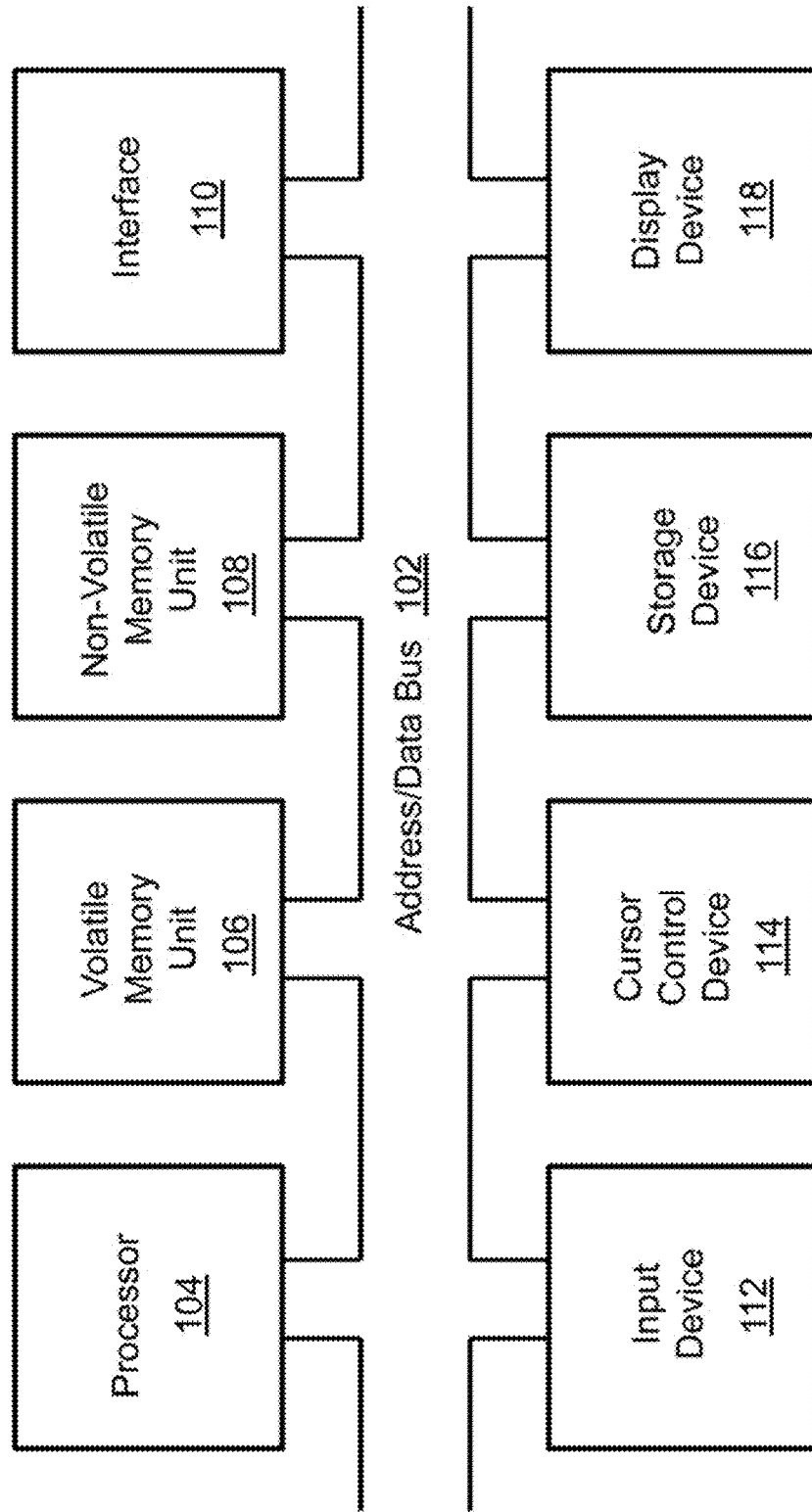
FIG. 1 is a block diagram depicting the components of a system for machine vision object classification according to some embodiments of the present disclosure.

The present invention relates to a system for machine-vision classification and, more particularly, to a system for machine-vision classification which incorporates object components to identify an object. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Sotiras, Aristeidis, Susan M. Resnick, and Christos Davatzikos. "Finding imaging patterns of structural covariance via non-negative matrix factorization." Neuro Image 108: 1-16, 2015.
2. Simonyan, Karen, and Andrew Zisserman. "Very deep convolutional networks for large-scale image recognition." arXiv preprint arXiv:1409.1556, 2014.
3. Lindeberg, Tony. Scale-space theory in computer vision. Vol. 256. Springer Science & Business Media, 2013.
4. Xie. Junyuan, Ross Girshick, and Ali Farhadi, "UnsupervisedDeep embedding for clustering analysis." arXiv preprint arXiv:1511.06335, 2015.
5. Zhou, B., Khosla, A., Lapedriza, A., Oliva, A., & Torralba, A. "Object detectors emerge in deep scene CNNs." arXiv preprint arXiv:1412.6856, 2014.
6. Gonzalez-Garcia, A., Modolo, D., &. Ferrari, V. "Do semantic parts emerge in convolutional neural networks?" arXiv preprint arXiv:1607.03738, 2016.
7. Kolouri, S., Rohde, G. K., & Hoffman, H. "Sliced wasserstein distance for learning gaussian mixture models." arXiv preprint arXiv:1711.05376, 2017.
8. Kolouri, S., Martin, C. E., & Hoffmann, H. "Explaining Distributed Neural Activations via Unsupervised Learning." In Proceedings of the IEEE Conference on Computer Vision and Pattern Recognition Workshops (pp. 20-28), 2017.

(2) Principal Aspects

Various embodiments of the invention include three "principal" aspects. The first is a system for machine vision object classification. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array ("PLA"), complex programmable logic device ("CPLD"), or a field programmable gate array ("FPGA").

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
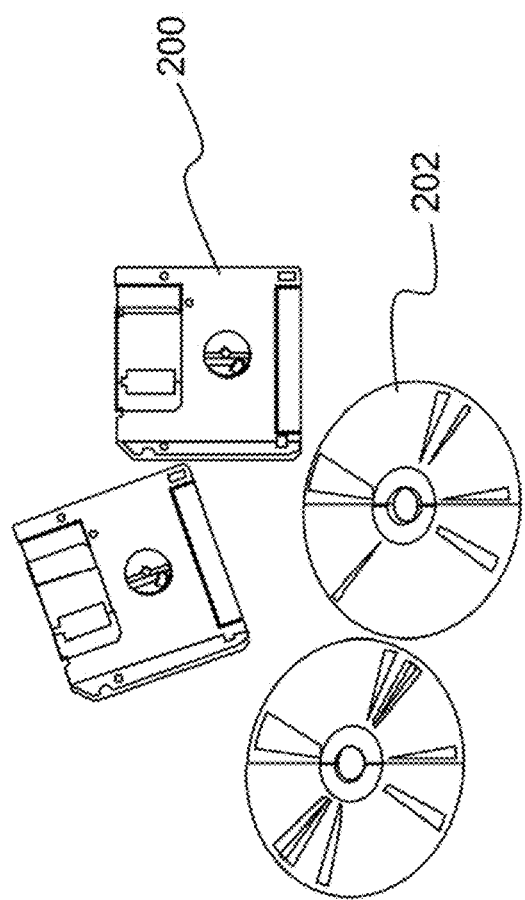
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a method to improve the recognition performance of a deep-learning network by learning object attribute classes (e.g., wheels or grille in a car image) in an unsupervised manner and use this information in parallel with the deep network for object detection. The invention includes a four-phase process, which allows for reliable detection of objects based on their components. In the first phase, a top-down approach is utilized to pinpoint the salient attributes of the input based on the activation patterns of a deep convolutional neural network (CNN). In the second phase, a bottom-up approach probes the CNN and extracts hierarchical responses of the network to individual salient attributes. In the third phase, an iterative unsupervised learning approach is applied to the features extracted from all salient attributes to identify the core attributes learned by the network. Finally, in a fourth phase, the input image is summarized by a feature indicating the occurrence frequency of the core attributes.

The system described herein provides a machine-vision system that incorporates object components to identify/classify the object. Specifically, the system uses a pre-trained CNN and learns visual attributes that are encoded in distributed activation patterns of the network. The prior art methods often utilize corresponding image regions with highest activations of each unit of a CNN to find object components. In contrast to such methods, the system according to embodiments of the present disclosure models the pattern of activations in a group of CNN units as opposed to single units to find object attributes/parts. In addition, the invention described herein combines the information extracted from key/core attributes with that of a conventional deep CNN and provides a significant improvement in the technology of object detection/classification performance compared to the prior art.

One purpose of this invention is to recognize objects or scenes in camera images. The camera may be electric, optical, infrared (IR), short wave IR, or similar, such that the output is an intensity image with one or more color-like channels. These one or multi-channeled intensity images are then processed to generated probabilities for a given set of object categories. The category with the highest probability, which may be the highest occurrence of features/attributes for that category, may identify the object or scene present in the image.

Figure 3:
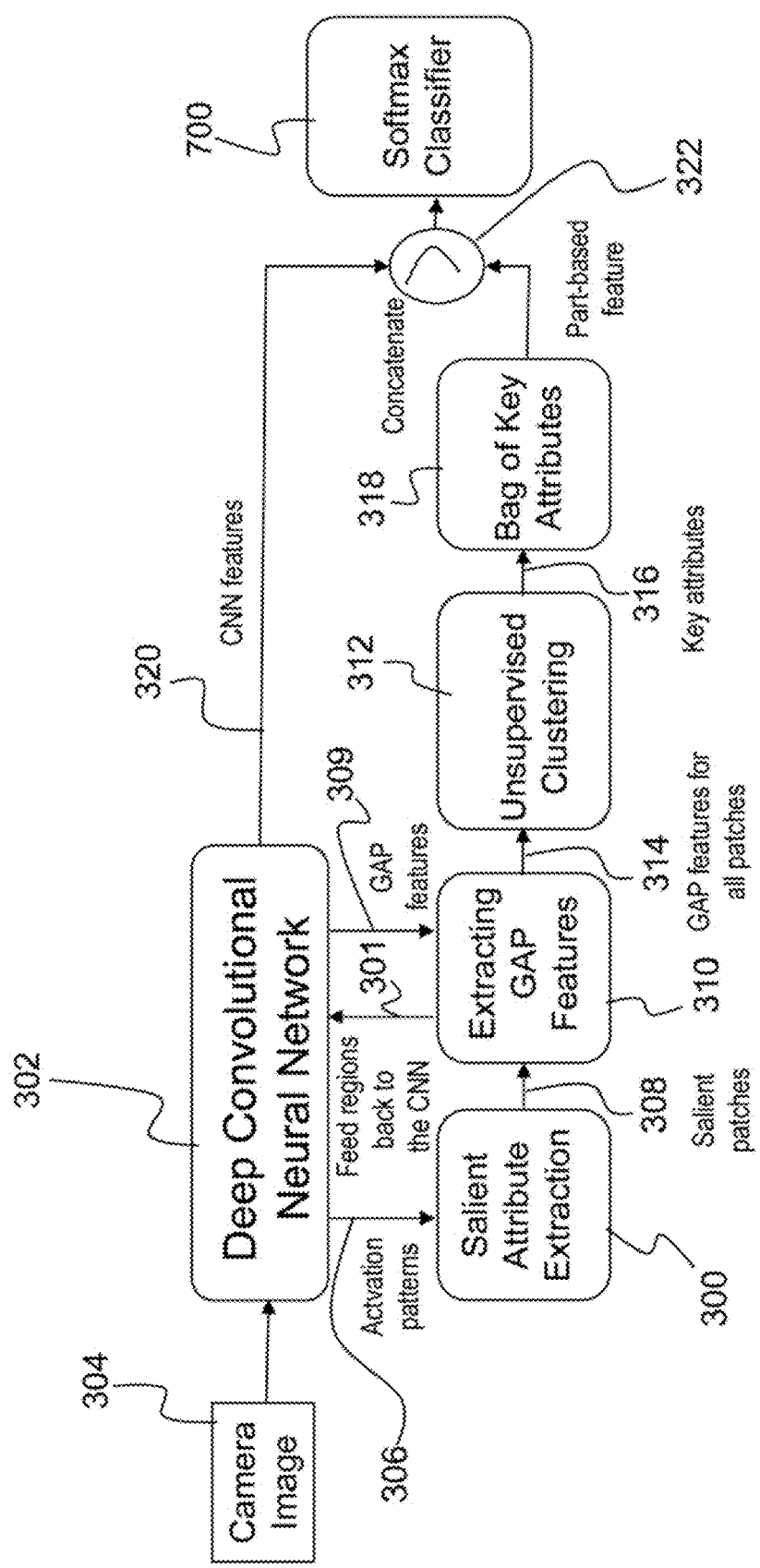
FIG. 3 is an illustration of the process flow of a system for classifying input data according to some embodiments of the present disclosure.

The prior art to compute these probabilities uses convolutional neural networks (CNN) (see Literature Reference No. 2). This invention improves upon CNNs by using an unsupervised scheme for identifying the learned key-attributes of a CNN. The key/core attributes are learned by first identifying the regions of the input image that are deemed salient by the network, and then analyzing the network's activation patterns in these salient regions. These core attributes are then used to improve the accuracy of category probabilities, which, in turn, could be used for classifying and categorizing the input image. FIG. 3 shows the process flow of the system described herein. In the following, the four main phases are described.

(3.1) Salient Attribute Extraction (Element 300)

Referring to FIG. 3, the system according to embodiments of the present disclosure starts by identifying salient regions of an input image. Given a pre-trained CNN (element 302) and an input camera image (element 304), elastic Nonnegative Matrix Factorization (NMF) (see Literature Reference No. 1) is applied to the activation patterns (i.e., last convolutional layer) of the CNN (element 302) to obtain and extract principal activation patterns (element 306) for the input camera data (element 304). Note that since the fully connected layers of the CNN (element 302) are not used at this stage, the size of the input image (element 304) could vary.

More precisely, let $X=[x_k]_{k=1}^m \in R^{d \times m}$ denote the vectorized CNN responses (e.g., element 501) of the last convolutional layer (e.g., the 'conv5_4' of VGG19 (see Literature Reference No. 2)), where m is the number of convolutional kernels at the last layer (e.g. m=512 in VGG19), and d is the number of nodes per convolutional kernel and scales with the size of the input image. Then, the NMF is formulated as, $$\mathrm{argmin}_{W,H} \tfrac{1}{2}\|X-HW\|_F^2 + \gamma\lambda(\|W\|_1 + \|H\|_1) + \tfrac{1}{2}\gamma(1-\lambda)(\|W\|_F^2 + \|H\|_F^2)$$

where $\|.\|_F$ is the Frobenius norm, $\|.\|_1$ is the elementwise $L_1$ norm, columns of $H \in R^{d \times r}$ are the non-negative components, $W \in R^{r \times m}$ is the non-negative coefficient matrix, r is the rank of matrix H, which corresponds to the number of extracted components, and $\lambda$ and $\gamma$ are regularization parameters. A coordinate descent solver is used to find H and W. After extracting the non-negative components, columns of H, and up-sampling (i.e., resizing to the original image size to counter the effect of pooling layers) each component, the image (i.e., NMF components 400) is processed by a Laplacian-of-Gaussian blob-detector (see Literature Reference No. 3) to extract regions of the input image (salient patches 308) that are considered salient by the CNN (element 302), and feed the regions back to the CNN (element 301).

Figure 4:
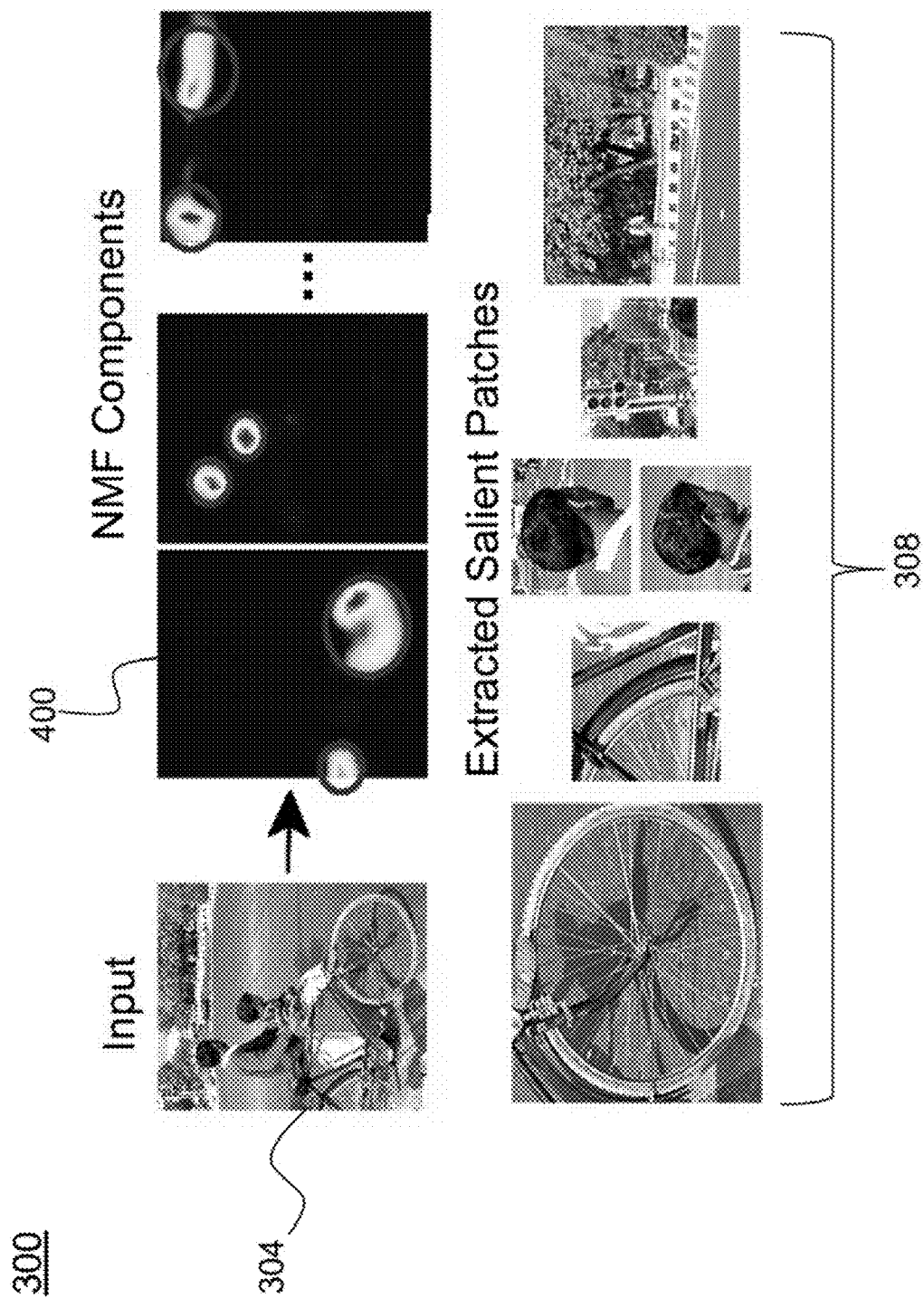
FIG. 4 is an illustration of extraction of salient patches from an input according to some embodiments of the present disclosure.

FIG. 4 provides an example of the salient attribute extraction (element 300), and shows the NMF components (element 400) and the extracted salient patches 308 for an input image (element 304). As shown, the NMF applied to the neural activation patterns of a CNN leads to semantically meaningful object attributes.

(3.2) Extracting GAP Features (Elements 309 and 310)

Figure 5:
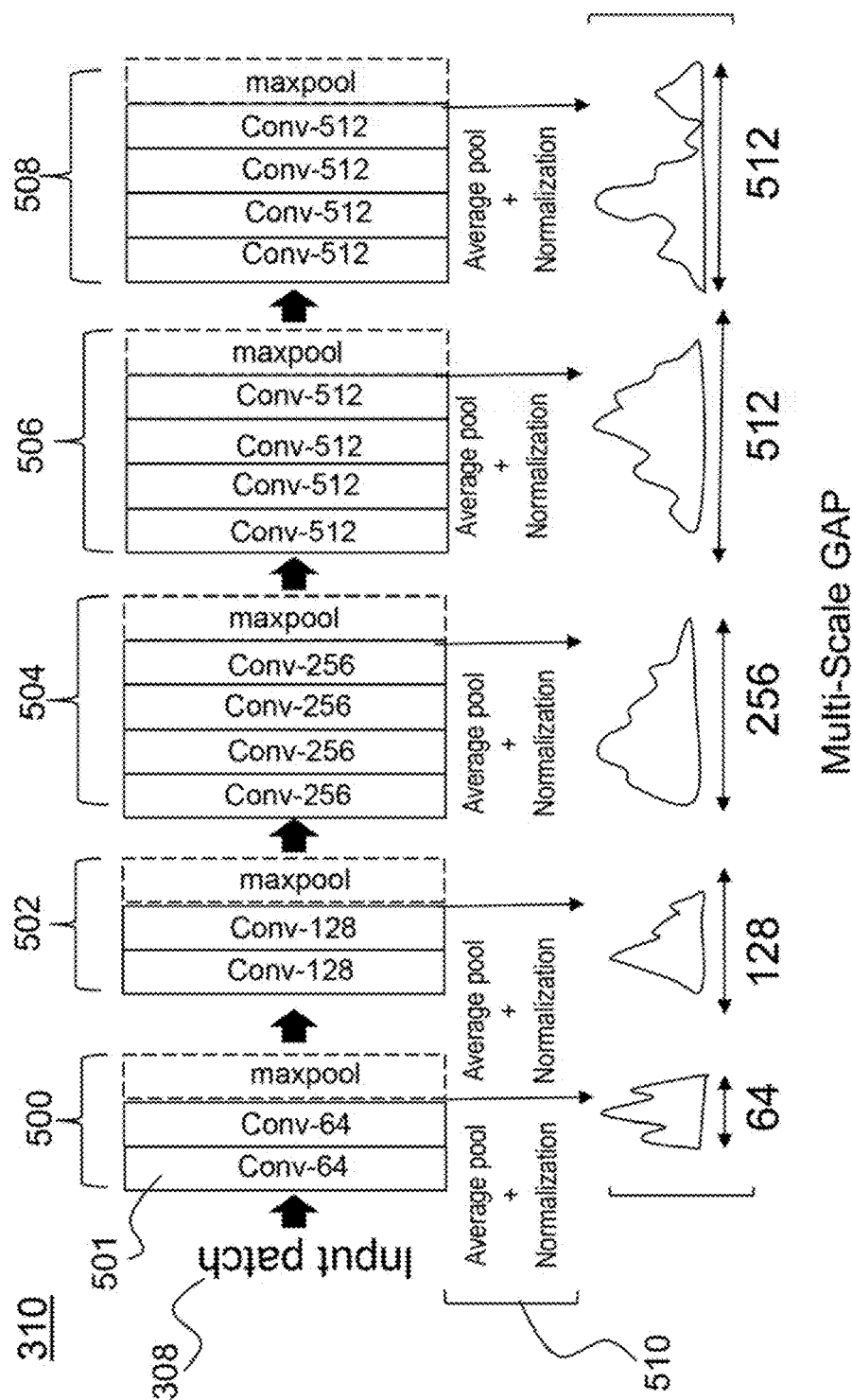
FIG. 5 is an illustration of multi-scale global average pooling (GAP) features extracted from image patches according to some embodiments of the present disclosure.

As depicted in FIG. 3, in phase two, the activation patterns 306 of the CNN 302 were probed at different layers, and a multi-scale feature (FIG. 3, GAP feature 309) was constructed for the extracted patches (element 308). As shown in FIG. 5, this is done by performing general average pooling (GAP) at each layer of the network (elements 500, 502, 504, 506, and 508) right before the 'max pooling' together with a normalization (element 510) and concatenating (FIG. 3, element 322) the outputs. The CNN feature (FIG. 3, element 320) captures the response energy of various convolutional kernels (e.g., 64, 128, 256, 512) at different layers, and provides a succinct representation of the CNN. The normalization (element 510) is needed so the scale of average pooling at different layers are the same (i.e., range is zero to one). FIG. 5 illustrates the extraction of the multi-scale GAP feature according to embodiments of the present disclosure from an input image patch (element 308) using VGG19 (see Literature Reference No. 2 for a description of VGG19).

(3.3) Unsupervised Clustering of Salient Attributes (Element 312)

Figure 6A:
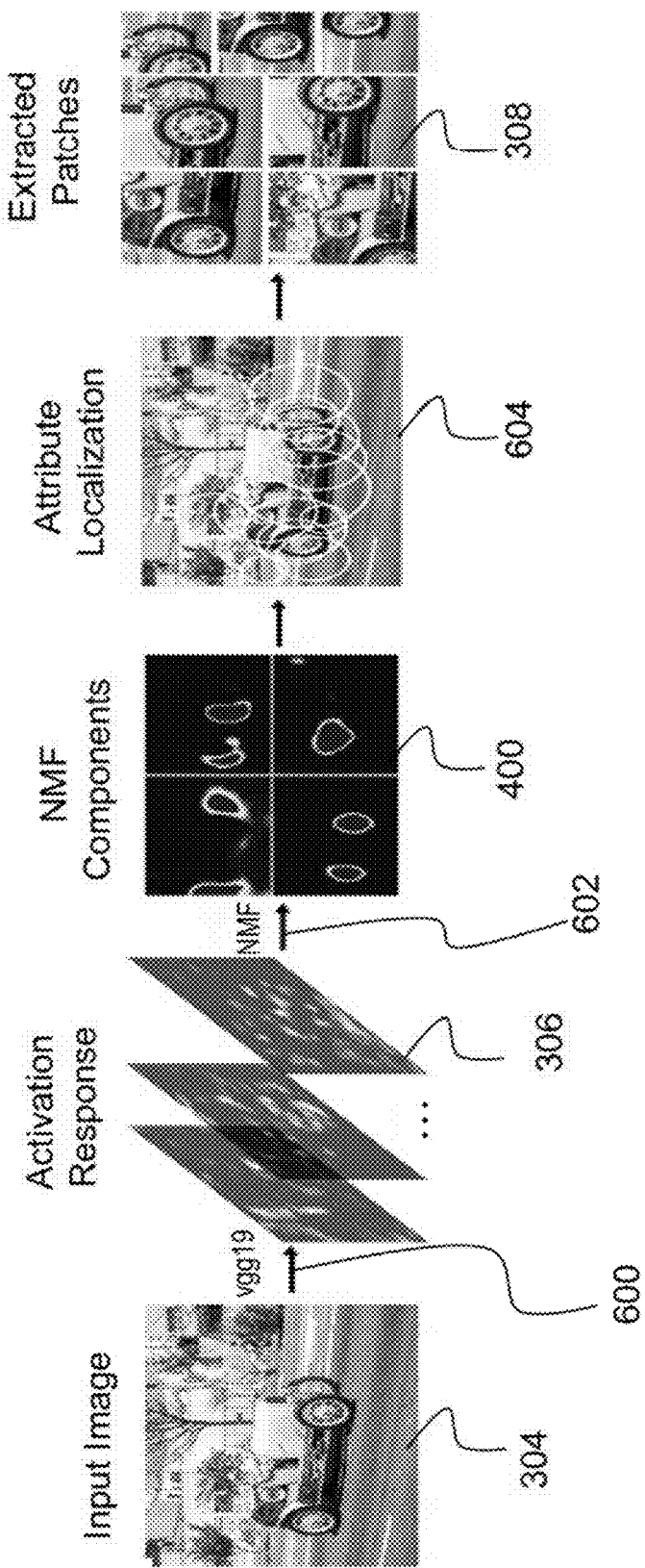
FIG. 6A is an illustration of extraction of data parts that the network deems salient according to some embodiments of the present disclosure.
Figure 6B:
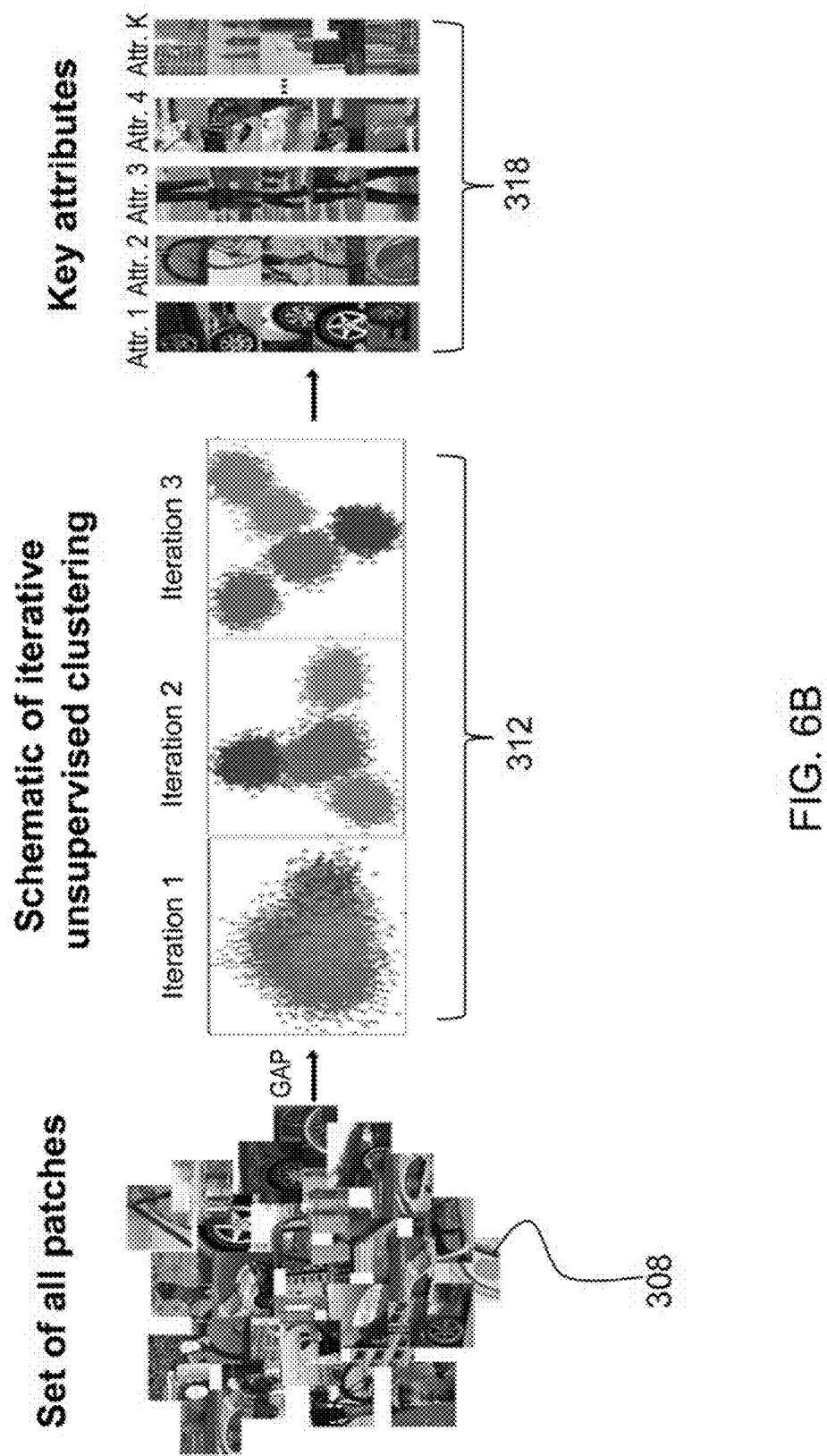
FIG. 6B is an illustration of identification of key attributes captured by the network using an unsupervised clustering technique according to some embodiments of the present disclosure.

FIGS. 6A and 6B depict a schematic of an unsupervised concept learning system (see Literature Reference No. 7). Given a deep network (e.g., VGG19 (see Literature Reference No. 2), the system described herein first extracts data parts that the network deems salient, as shown in FIG. 6A. Specifically, the activation response (or activation patterns 306) are extracted from an input image (element 302) via the CNN (e.g., vgg19 600). NMF (element 602) is applied to the activation response/patterns (element 306), resulting in NMF components 400. The system then performs attribute localization 604 (see Literature Reference No. 8 for a description of attribute localization) and outputs extracted patches (element 308).

In the third phase, having the salient patches from all images in the dataset and their corresponding GAP+CNN features (i.e., GAP features for all patches 314 and CNN features 320), an unsupervised learning framework is utilized to identify the core/key attributes (element 316) recognized by the network. In one embodiment and as shown in FIG. 6B, the unsupervised deep embedding is used for clustering (DEC) (see Literature Reference No. 4) to cluster (element 312) the salient extracted patches (element 308). The idea behind DEC is to transform the data into a linear/nonlinear embedding space with richer data representation and cluster the data in that space. The embedding and the clusters are then learned simultaneously in an iterative fashion (element 312). FIG. 6B illustrates sample key attributes (element 318) extracted from the system described herein.

(3.4) Bag of Key Attributes (Element 318)

Figure 7A:
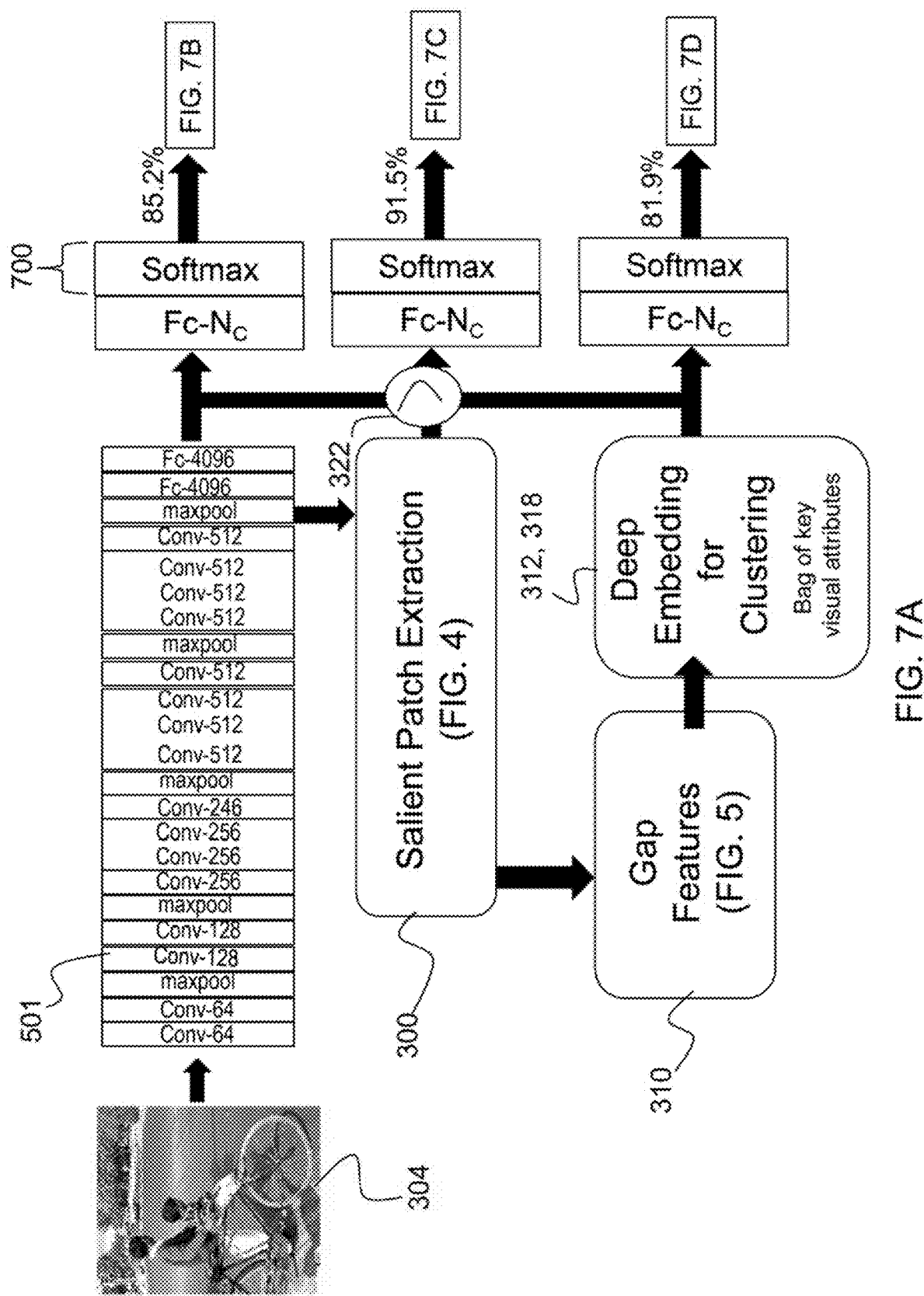
FIG. 7A is an illustration of calculation of a bag of key visual attributes feature for a given input image, which is concatenated to the output of the CNN before the classifier according to some embodiments of the present disclosure.
Figures 7B, 7C:
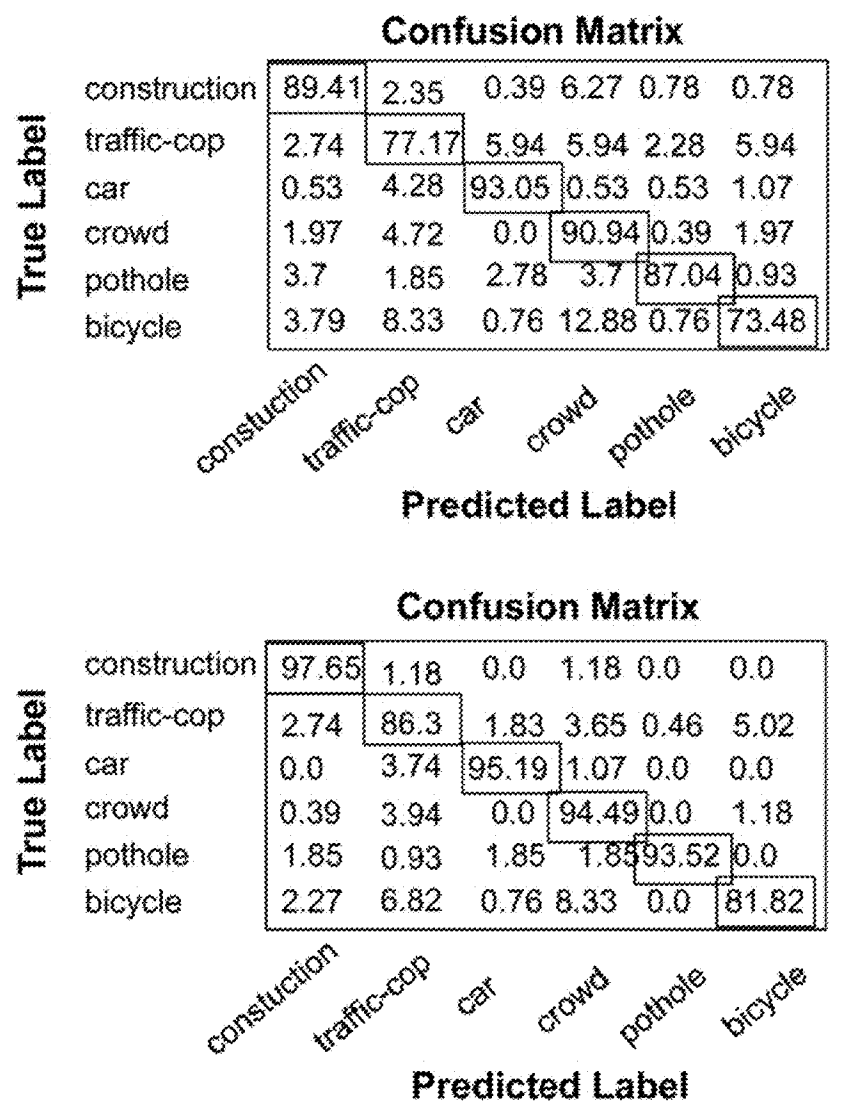
Figure 7D:
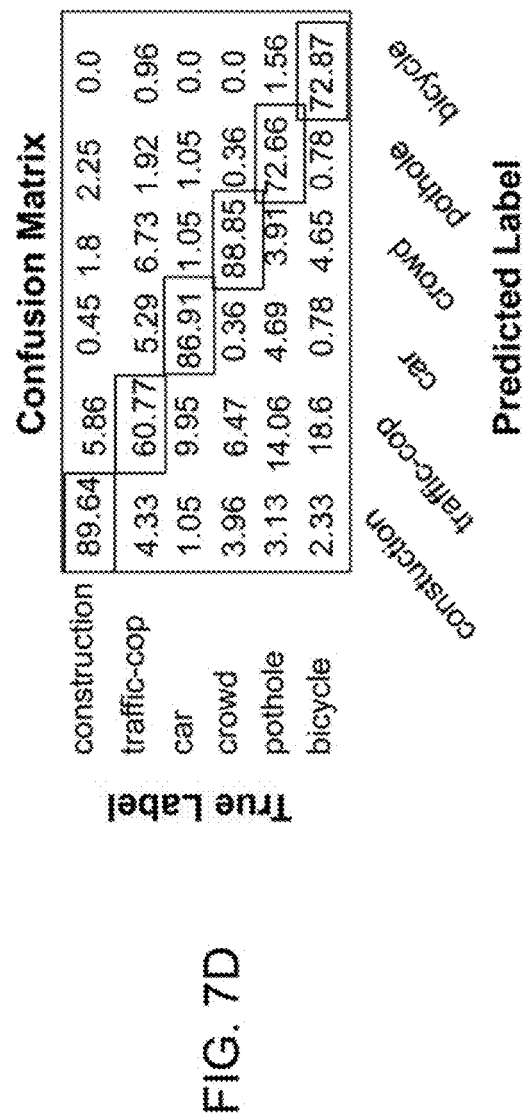
FIG. 7D is an illustration of a third confusion matrix according to some embodiments of the present disclosure.

The outcome of the unsupervised deep embedding method (elements 312 and 318) is a mapping, $f_a$, that embeds the input GAP+CNN features (i.e., GAP features for all patches 314 and CNN features 320) into a discriminant subspace, together with the key attributes (element 316), $\mu_j$ for j=1, . . . , k. For a given input image 304, the system identifies the salient regions of the image (element 308), extracts GAP+CNN features (elements 314 and 320) from the M identified salient regions, $v_i$ for i=1, . . . , M (M could vary for different input images), maps the features to the embedding via $f_a$, and obtains their cluster membership (element 312). Using the cluster memberships, the system described herein generates the histogram of key attributes (element 316) presented in an image, which encodes the normalized frequency of key attribute occurrences. For instance, the bag of key attributes (BoKA) feature (element 318) in a car classification example would encode existence or lack of corresponding key attributes, such as wheels, doors, and headlights. Then, as depicted in FIG. 7A, for a given input image (element 304), its BoKA feature is calculated (element 318) and concatenated (element 322) to the output of the CNN right before the Softmax classifier (element 700). In this manner, the network's extracted feature is enriched with an emphasis on the key learned attributes. Finally, the Softmax layer (element 700) of the CNN is retrained to account for the BoKA feature (element 318). As can be seen in FIGS. 7A-7D, a test input image (element 304) goes through the system according to embodiments of the present disclosure, and the final classification is obtained based on the concatenated features obtained. In experimental studies, supplementing the VGG19 network (element 312) with BoKA features (element 318) led a 42.5% reduction in classification error on average. FIGS. 7B, 7C, and 7D depict confusion matrices that provide visualization of the classification results.

The embodiments described herein have multiple applications. For instance, the system directly addresses the need for a robust and foolproof object detector in autonomous driving by providing an attribute oriented object detector with higher precision as compared to the state-of-the-art. Current object detectors are easily fooled by noise and occlusion and the false alarms generated by them are not explainable. The attribute oriented system according to embodiments of the present disclosure enables one to reduce such false alarms by considering the core attributes of an object, thereby dramatically improving the technology associated with object detection.

Figure 8:
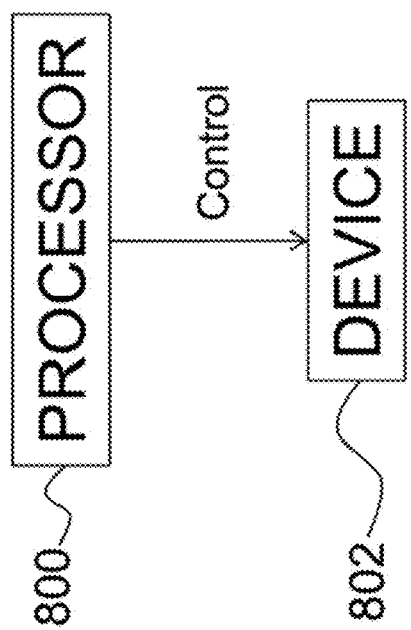
FIG. 8 is a flow diagram illustrating control of devices using the object category according to some embodiments of the present disclosure.

FIG. 8 is a flow diagram illustrating using a processor 800 to control a device 802 using the object category. Non-limiting examples of devices 802 that can be controlled via the processor 800 and the object categories include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. For instance, in generating an object category for an object, the system described herein can associate the object category with a traffic sign and cause the autonomous vehicle to perform a driving operation/maneuver (such as steering or another command) in line with driving parameters in accordance with the traffic sign. For example, if the sign is a stop sign, the system may cause the autonomous vehicle to apply a functional response, such as a braking operation, to stop the vehicle.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular detected object and the circumstances in which the system is implemented.

In a specific non-limiting example, the system described herein can process camera images to give instructions to an autonomous vehicle (e.g., car). For instance, if a bicyclist is detected on the side of the road near the autonomous vehicle, the system according to embodiments of the present disclosure sends an instruction to execute a control loop specifically designed to avoid the bicycle. Such control loops can be found in the prior art, such as in U.S. Pat. No. 9,229,453, entitled, "Unified motion planner for autonomous driving vehicle in avoiding the moving obstacle," which is incorporated herein by reference as though fully set forth herein.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for classifying intensity image data, the system comprising:
   one or more processors and a non-transitory computer-readable medium having executable instructions encoded thereon such that when executed, the one or more processors perform operations of:
      identifying salient regions of an intensity image based on activation patterns of a convolutional neural network (CNN) having a plurality of layers;
      generating multi-scale features for the salient regions by probing the activation patterns of the CNN at different layers;
      using an unsupervised clustering technique, clustering the multi-scale features to identify key attributes captured by the CNN,
      wherein the unsupervised clustering technique is an unsupervised deep embedding method, and wherein the output of the unsupervised deep embedding method is an embedding mapping that embeds the multi-scale features into a subspace with the key attributes;
      obtaining a cluster membership for each salient region using the embedding mapping;
      using the cluster memberships, generating a histogram of key attributes, wherein the histogram of key attributes encodes a normalized frequency of key attribute occurrences;
      mapping from the histogram of the key attributes onto probabilities for a set of object categories;
      classifying at least one object or scene in the intensity image as belonging to an object category using the probabilities; and
      controlling a vehicle component based on the object category causing the vehicle component to perform an automated action.

2. The system as set forth in claim 1, wherein each salient region is extracted from the intensity image and identified based on the CNN's activation for each image pixel or group of image pixels in the salient region.

3. The system as set forth in claim 1, wherein for generating the multi-scale features, the one or more processors perform general average pooling (GAP) at each layer of the CNN.

4. The system as set forth in claim 1, wherein the one or more processors further perform operations of:
calculating a bag of key attributes (BoKA) feature for the intensity image using deep embedding for clustering;
concatenating the BoKA feature with an output feature of the CNN, resulting in concatenated features; and
using the concatenated features for classifying the at least one object or scene in the intensity image.

5. A computer implemented method for classifying intensity image data, the method comprising an act of:
causing one or more processers to execute instructions encoded on a non-transitory computer-readable medium, such that upon execution, the one or more processors perform operations of:
identifying salient regions of an intensity image based on activation patterns of a convolutional neural network (CNN) having a plurality of layers;
generating multi-scale features for the salient regions by probing the activation patterns of the CNN at different layers;
using an unsupervised clustering technique, clustering the multi-scale features to identify key attributes captured by the CNN,
wherein the unsupervised clustering technique is an unsupervised deep embedding method, and wherein the output of the unsupervised deep embedding method is an embedding mapping that embeds the multi-scale features into a subspace with the key attributes;
obtaining a cluster membership for each salient region using the embedding mapping;
using the cluster memberships, generating a histogram of key attributes, wherein the histogram of key attributes encodes a normalized frequency of key attribute occurrences;
mapping from the histogram of the key attributes onto probabilities for a set of object categories;
classifying at least one object or scene in the intensity image as belonging to an object category using the probabilities; and
controlling a vehicle component based on the object category causing the vehicle component to perform an automated action.

6. The method as set forth in claim 5, wherein each salient region is extracted from the intensity image and identified based on the CNN's activation for each image pixel or group of image pixels in the salient region.

7. The method as set forth in claim 5, wherein for generating the multi-scale features, the one or more processors perform general average pooling (GAP) at each layer of the CNN.

8. The method as set forth in claim 5, wherein the one or more processors further perform operations of:
calculating a bag of key attributes (BoKA) feature for the intensity image using deep embedding for clustering;
concatenating the BoKA feature with an output feature of the CNN, resulting in concatenated features; and
using the concatenated features for classifying the at least one object or scene in the intensity image.

9. A computer program product for classifying intensity image data, the computer program product comprising:
computer-readable instructions stored on a non-transitory computer-readable medium that are executable by a computer having one or more processors for causing the processor to perform operations of:
identifying salient regions of an intensity image based on activation patterns of a convolutional neural network (CNN) having a plurality of layers;
generating multi-scale features for the salient regions by probing the activation patterns of the CNN at different layers;
using an unsupervised clustering technique, clustering the multi-scale features to identify key attributes captured by the CNN,
wherein the unsupervised clustering technique is an unsupervised deep embedding method, and wherein the output of the unsupervised deep embedding method is an embedding mapping that embeds the multi-scale features into a subspace with the key attributes;
obtaining a cluster membership for each salient region using the embedding mapping;
using the cluster memberships, generating a histogram of key attributes, wherein the histogram of key attributes encodes a normalized frequency of key attribute occurrences;
mapping from the histogram of the key attributes onto probabilities for a set of object categories;
classifying at least one object or scene in the intensity image as belonging to an object category using the probabilities; and
controlling a vehicle component based on the object category causing the vehicle component to perform an automated action.

10. The computer program product as set forth in claim 9, wherein each salient region is extracted from the intensity image and identified based on the CNN's activation for each image pixel or group of image pixels in the salient region.

11. The computer program product as set forth in claim 9, wherein for generating the multi-scale features, the one or more processors perform general average pooling (GAP) at each layer of the CNN.

12. The computer program product as set forth in claim 9, further comprising instructions for causing the one or more processors to further perform operations of:
calculating a bag of key attributes (BoKA) feature for the intensity image using deep embedding for clustering;
concatenating the BoKA feature with an output feature of the CNN, resulting in concatenated features; and
using the concatenated features for classifying the at least one object or scene in the intensity image.

* * * * *